Nov. 1, 1927.  1,647,404
W. GEHRIG
STEERING APPARATUS FOR VEHICLES
Filed Jan. 23, 1926  3 Sheets-Sheet 1
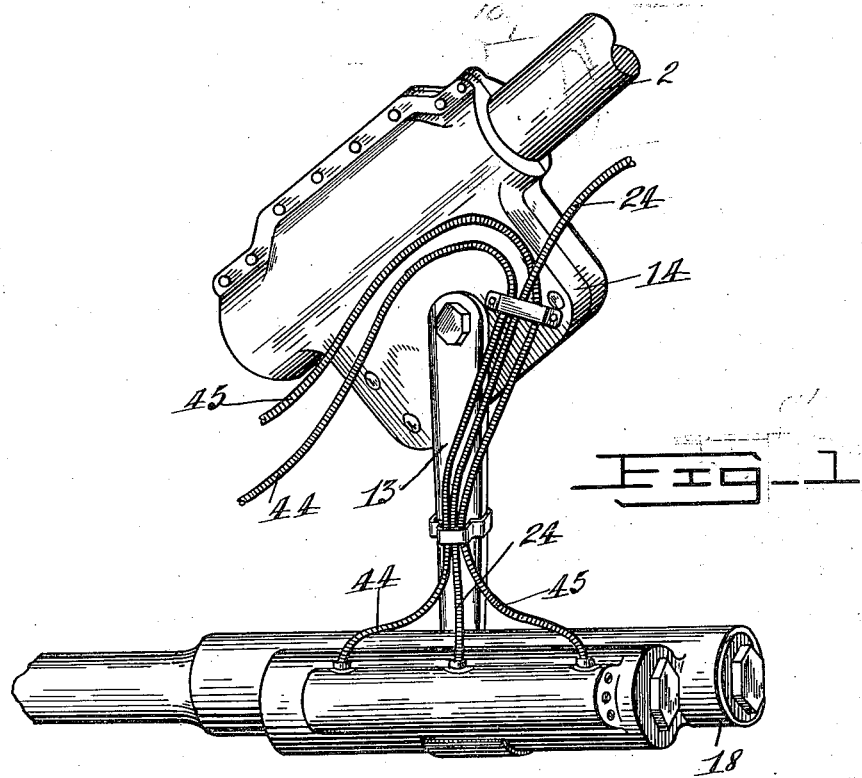
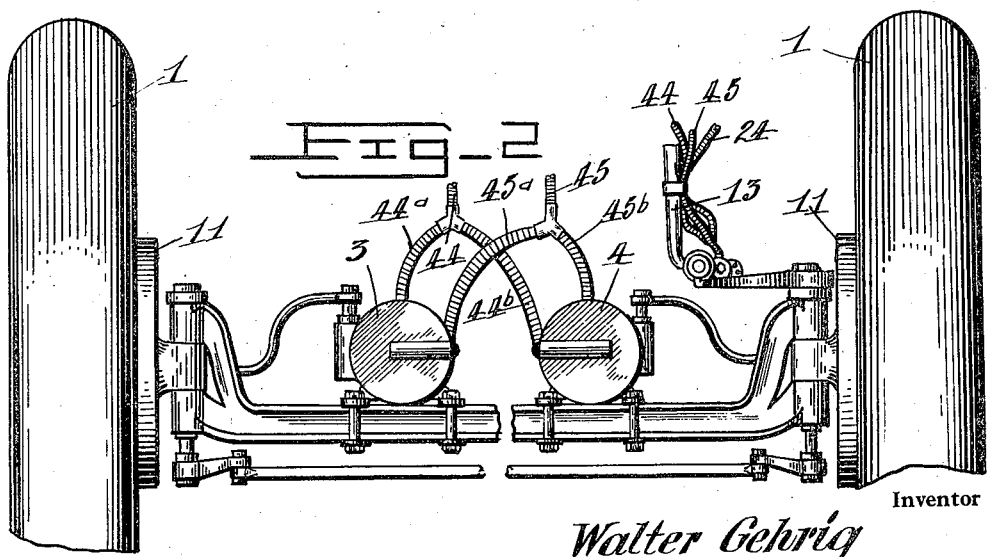
Inventor
Walter Gehrig
By William Clinton
Attorney

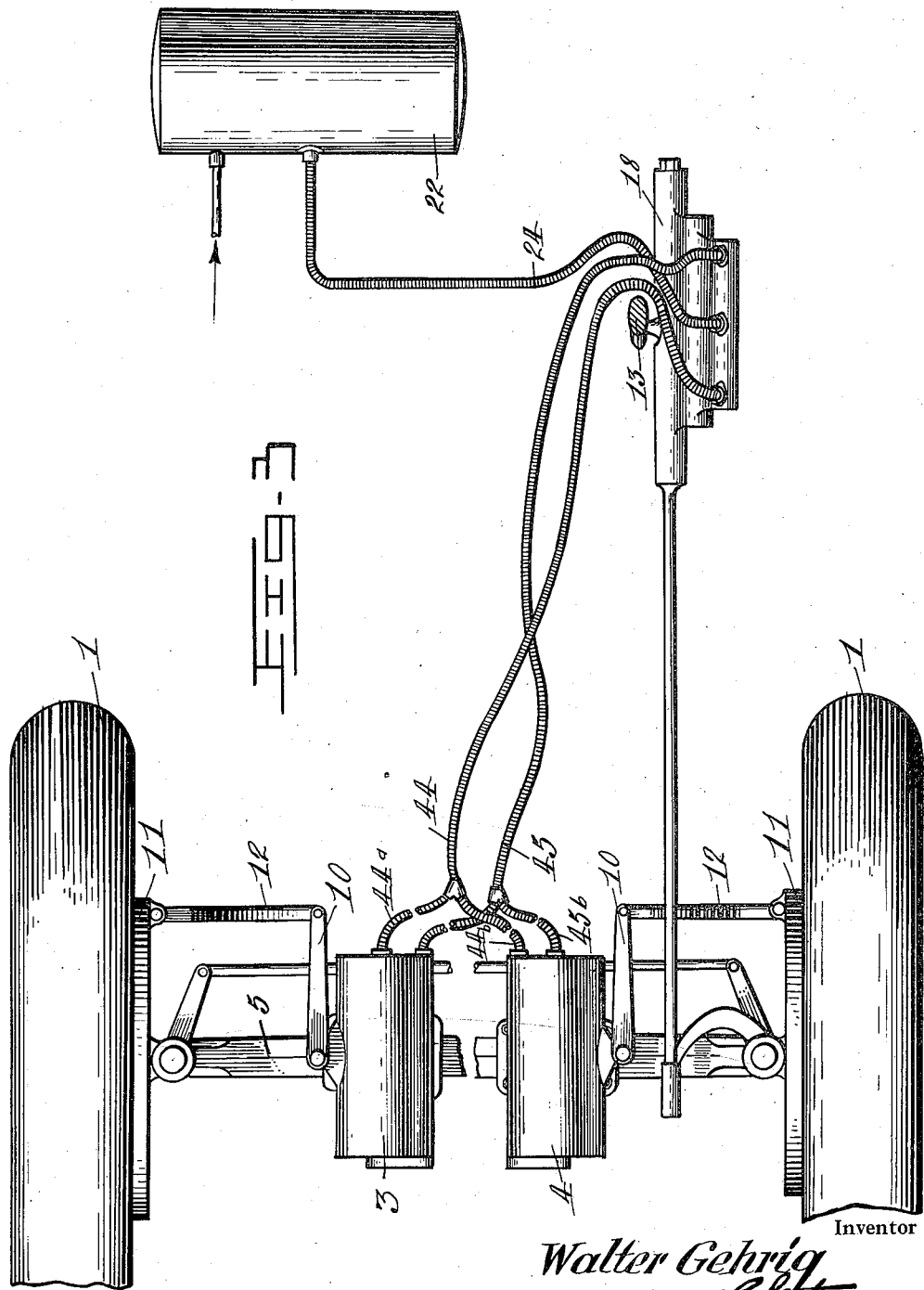

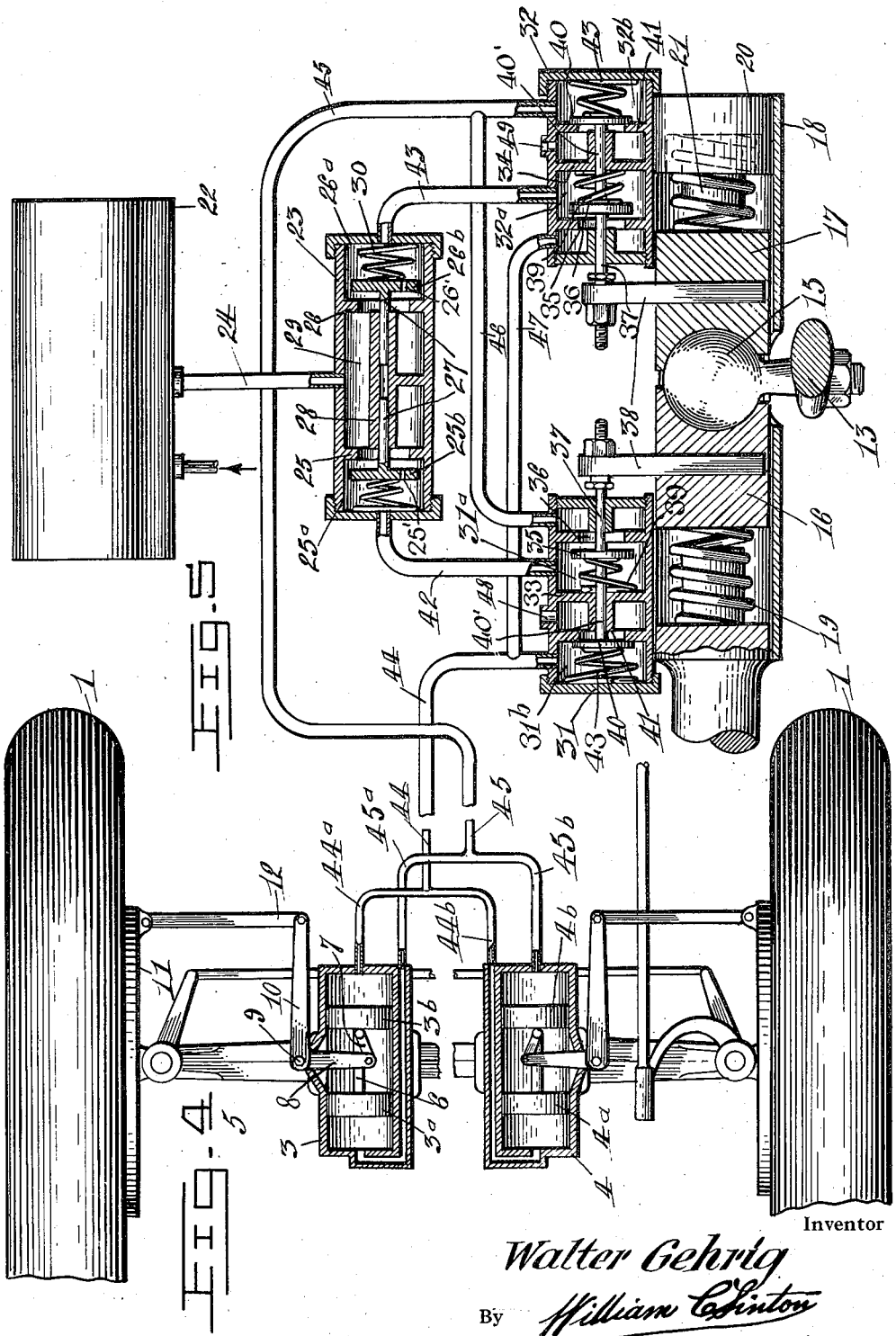

Patented Nov. 1, 1927.

1,647,404

UNITED STATES PATENT OFFICE.

WALTER GEHRIG, OF MONTREAL, QUEBEC, CANADA.

STEERING APPARATUS FOR VEHICLES.

Application filed January 23, 1926. Serial No. 83,404. REISSUED

The present invention pertains to a steering apparatus for vehicles and is applicable particularly to heavy automobile trucks, buses or other motor vehicles carrying balloon tires.

The principal object of the invention is to provide mechanical means for facilitating the steering of such vehicles. It has been found that motor vehicles equipped with the so called balloon tires are much more difficult to steer than vehicles carrying tires of smaller diameter and greater pressure, and a greater turning of the steering wheel is required for making the same size of turn. Another difficulty arising out of the use of balloon tires is that there is a greater tenddency of the front wheels to wobble. Motor buses and trucks at present in use are so constructed that three to three and a half revolutions of the steering wheel are required for making the maximum turn. The driver of such a vehicle, in order to operate the same in this manner, is required to slow down in approaching an intersection in order to allow sufficient time to turn the steering wheel. In case of accident or an unforeseen obstacle, it is impossible for a heavy vehicle at high speed to be turned sharply to avoid danger.

The present invention overcomes the foregoing difficulties by providing an apparatus whereby a sharp turn may be quickly made without unreasonable exertion on the part of the driver. Even in the case of the large balloon tires, a vehicle equipped with the invention requires no more turning of the steering wheel than vehicles having smaller tires under greater pressure.

The invention consists essentially of double pistons mounted in cylinders and linked to the forward wheels of the vehicle, in combination with valve mechanism operable from the steering post for controlling a flow of pressure to the ends of the cylinders.

A further feature of the invention is that the double pistons are normally under balanced pressure in the cylinders, whereby wobbling of the front wheels or deflection on striking obstacles is substantially prevented.

The invention is fully disclosed in the following description and in the accompanying drawings in which;

Figure 1 is a perspective view of the device applied to the steering post of a vehicle;

Figure 2 is a front elevation of a vehicle equipped with the invention;

Figure 3 is a plan view of the device as applied to a vehicle;

Figure 4 is a plan view of the forward part of a vehicle equipped with the invention, the wheel control cylinders being shown in section; and Figure 5 is a sectional view of the remaining part of the apparatus, parts being shown in elevation.

Reference to these views will now be made by use of like characters which are employed to designate corresponding parts throughout.

The appliance constituting this invention is connected with the forward wheels 1 of a vehicle, or those wheels which are designed to be steered from the usual steering post 2. A pair of wheel control cylinders 3 and 4 are supported near the wheels 1, preferably on the axle 5. The cylinders contain double pistons, $3^a$, $3^b$ and $4^a$, $4^b$ respectively, each pair being joined by a rod 6. To one piston of each pair is pivoted a finger 7 to which in turn is pivoted one end of a link 8, the remaining end of which is rigidly secured as at 9 to an arm 10 which is connected to the brake drum 11 by means of another link 12 connected pivotally to the members 10 and 11.

This mechanism is controlled, by the apparatus hereinafter described, from the steering post 2 which is connected by a worm and pinion (not shown) to an arm 13 pivotally mounted in a housing 14 clamped to the post 2. The lower end of the arm 13 carries a ball 15 which is received between two blocks 16 and 17 slidably mounted in a casing 18 supported at any convenient position. The two blocks 16 and 17 are pressed against the ball 15 by means of springs 19 bearing against these blocks and against the ends 20 of the cylinder 18. Stubs 21 secured in the ends 20 limit the outward movement of the blocks 16 and 17.

The numeral 22 designates the tank for containing the compressed air for the air brakes, and this tank is used also for operating the apparatus comprising this invention. Between the cylinder 18 and tank 22 is mounted an absorber tank 23, the centre of which is in communication with the tank 22 by means of a pipe 24. Valve seats 25 and 26 are formed at the ends of the tank and define valve chambers 25ᵃ and 26ᵃ which may communicate with the pipe 24 through the seats. These chambers contain the valves 25ᵇ and 26ᵇ having stems 27 slidably received in the bushing 28 disposed in the intermediate portion 29 of the cylinder. The valve heads are normally pressed towards their seats by springs 30 mounted in the compartments.

Between the absorber cylinder 23 and the cylinder 18 are mounted a pair of valve cylinders 31 and 32 which are associated with the blocks 16 and 17 in the manner hereinafter set forth. Although the several cylinders are illustrated as separated in Figure 5 for convenience of description, they may be actually embodied in a single casting as shown in Figure 1.

The valve cylinders contain partitions 33 and 34 dividing the cylinders into primary compartments 31ᵃ, 32ᵃ and secondary compartments 31ᵇ and 32ᵇ. Each primary compartment contains a valve 35 co-operating with a seat 36 and having a stem 37 secured to an arm 38 carried by the corresponding block 16 or 17. These primary valves are normally urged towards their seats by springs 39 bearing against the partitions 33 and 34.

Each secondary compartment contains also a valve 40 co-operating with a seat 41 and having a stem 40′ separate from but adapted to engage the primary valve 35. The secondary valves are also normally pressed towards their seats by springs 43 engaging the outer ends of the cylinders 31 and 32.

The primary compartments 31ᵃ and 32ᵃ communicate from one side of their valve seats with the ends of the cylinder 23 through pipes 42 and 43. The secondary compartments at one side of the valve seat communicate with fluid supply pipes 44 and 45, the former being branched as at 44ᵃ and 44ᵇ to connect with one end of the cylinder 3 and the remaining end of the cylinder 4, while the other pipe is branched as at 45ᵃ and 45ᵇ to connect with the remaining ends of these cylinders. The primary cylinders, at the sides of their valve seats opposite the pipes 42 and 43, are connected through by-passes 46 and 47 into the lines 45 and 44 respectively. The secondary compartments, at the sides of their valve seats opposite the pipes 44 and 45, are formed with exhaust ports 48 and 49 respectively leading to the atmosphere.

The apparatus is illustrated in Figures 4 and 5 with the parts in neutral position. The pressure from the tank 22 causes the valves 25ᵇ and 26ᵇ to uncover their respective seats, whereupon the pressure fluid flows through pipes 42 and 43 to the primary compartments. The valve seats 36 are held normally open when the steering rod 2 is in position to point the wheels 1 directly forward. From the compartment 31ᵃ the pressure fluid flows through by-pass 46, pipe 45 and branches 45ᵃ and 45ᵇ to the forward end of cylinder 3 and the rear end of cylinder 4. From the primary compartment 32ᵃ, the pressure fluid flows through by-pass 47, pipe 44, branches 44ᵃ and 44ᵇ to the rear end of cylinder 3 and the forward end of cylinder 4. The equal pressures on both sides of the double pistons obviously causes no displacement of the pistons.

If one of the wheels 1 is deflected by coming into contact with an irregularity, such as a rock or rut, in the road, a corresponding displacement of the double pistons occurs through their connections to the brake bands 11. The cylinder ends which are thus enlarged are instantly filled with fluid at the pressure of the tank 22 through the open communications to this tank. At the cylinder ends which are diminished in size, there can be no considerable back pressure to the secondary compartments 31ᵇ and 32ᵇ, for these are closed by their respective valves. Consequently this pressure flows through the by-passes 46 and 47 to the primary compartments and through the pipes 42 and 43 to the ends of the cylinder 23, whereupon the valves therein are thus closed to the supply pipe 24. A compression must therefore occur in the ends of cylinders 3 and 4 which tends to decrease in volume, and this pressure acts as resistance to the deflection of the wheels caused by the irregularity in the road. In order that this resistance shall not be complete, the valve heads 25ᵇ and 26ᵇ are formed with ports 25′ and 26′ adapted to communicate with the chamber 29 although the valves may be closed. These ports, which are of comparatively small size, permit a slow relief of pressure whereby the action of the wheels is cushioned. The same action occurs when there is a tendency for the front wheels to wobble.

In the operation of the device, assuming that the vehicle is to be steered to the right, the driver turns the steering wheel in the usual manner. Ordinarily considerable force is required to turn the heavy wheels of a truck, and for a large turn several revolutions of the steering post are often necessary. The gearing placed within the housing 14 is constructed to swing the arm 13 to the right, with reference to Figures 1 and 5, when the steering wheel is turned to the right. The stem 38 causes the valve seat 36 in the cylinder 31 to be closed, and the flow of pressure through the pipe 46 to the forward end of cylinder 3 and rear end of cylinder 4 is obstructed. At the same time the primary valve in cylinder 32 is retracted and brought into engagement with the stem of the secondary valve, whereupon the secondary valve seat in the cylinder is opened. The compartment 32ᵇ is thus brought into free communication with the exhaust port 49, and exhaust is permitted from the forward end of cylinder 3 and rear end of cylinder 4. Exhaust also occurs from the primary compartment 31ª through the by-pass 46, thereby aiding in the closure of valve 35 under the pressure of fluid delivered through pipe 42.

Pressure fluid is still supplied through pipe 43 to the primary compartment of cylinder 32 and continues to flow through by-pass 47, pipe 44 and branches 44ª and 44ᵇ to the rear end of cylinder 3 and forward end of cylinder 4. This pressure serves to move the double pistons towards the ends in which the pressure has been relieved, whereupon the two wheels 1 are turned in unison through the linkages connecting them to the double pistons. Obviously a similar operation takes place when the vehicle is to be steered to the left.

For steering adjustments which are too small to establish contact between the stems of the secondary valves and the heads of the primary valves, the apertures 25' and 26' in the valves 25ᵇ and 26ᵇ respectively diminish the resistance to the displacement of the double pistons.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. In combination with the forward wheels of a vehicle, a wheel control cylinder containing pistons linked to said wheels, valve cylinders, partitions in said valve cylinders dividing the same into two compartments, a valve in each compartment, an operative connection between the valves in each cylinder and the steering mechanism of the vehicle, one of the compartments of each valve cylinder being in fluid communication with one of the ends of the control cylinder, and means for admitting pressure fluid into the remaining compartments.

2. In combination with the forward wheels of a vehicle, a wheel control cylinder containing pistons linked to said wheels, valve cylinders, partitions dividing each of said valve cylinders into a primary and secondary compartment, a primary valve in each primary compartment, an operative connection between the primary valves and the steering mechanism of the vehicle, conduits connecting the primary compartments with one end of the control cylinder, secondary valves in the secondary compartments, conduits connecting said secondary compartments with the remaining end of the control cylinder, said secondary valves being engageable by said primary valves, exhaust means associated with said secondary compartments, and means for supplying pressure fluid to said primary compartments.

3. In combination with the forward wheels of a vehicle, wheel control cylinders supported by the vehicle, pistons mounted in said cylinders and linked to the wheels, a pair of valve cylinders, partitions in said valve cylinders dividing the same into two compartments, a valve in each compartment, an operative connection between the valves and each cylinder and the steering mechanism of the vehicle, one of the compartments of each valve cylinder being in communication with one of the ends of each control cylinder, and means for admitting pressure fluid into the remaining compartments.

4. In combination with the forward wheels of a vehicle, a pair of wheel control cylinders supported by the vehicle, pistons mounted in said cylinders and linked to said wheels, a pair of valve cylinders, partitions dividing each of said valve cylinders into a primary and secondary compartment, a valve in each primary compartment, operative connection between the primary valves and the steering mechanism of the vehicle, conduits connecting the primary compartments with one end of each control cylinder, secondary valves in the secondary compartments, conduits connecting the secondary compartments with the remaining ends of the control cylinders, said secondary valves being engageable by said primary valves, exhaust means associated with said secondary compartments, and means for supplying pressure fluid to said primary compartments.

5. In combination with the forward wheels of a vehicle, a pair of wheel control cylinders supported by the vehicle, pistons mounted in said cylinders and linked to said wheels, a pair of valve cylinders, partitions dividing each of said valve cylinders into a primary and secondary compartment, a valve in each primary compartment, operative connection between the primary valves and the steering mechanism of the vehicle, conduits connecting the primary compartments with one end of each control cylinder, secondary valves in the secondary compartments, conduits connecting the secondary compartments with the remaining ends of the control cylinders, said secondary valves being engageable by said primary valves, exhaust means associated with said secondary compartments, an absorber cylinder having its ends connected to said primary compartments, spring pressed valves mounted in the ends of the absorber cylinder, each of said valves having an unobstructable port therethrough, and a pressure fluid tank connected to said absorber cylinder intermediate said valves.

6. In combination with the forward wheels of a vehicle, a wheel control cylinder containing pistons linked to said wheels, valve cylinders, partitions in said valve cylinders dividing the same into two compartments, a valve in each compartment, and yieldingly operative connection between the valves in each cylinder and the steering mechanism of the vehicle, one of the compartments of each valve cylinder being in fluid communication with one of the ends of the control cylinder and means for admitting pressure fluid into the remaining compartments.

7. In combination with the forward wheels of a vehicle, a pair of wheel control cylinders supported by the vehicle, pistons mounted in said cylinders and linked to said wheels, a pair of valve cylinders, partitions dividing each of said valve cylinders into a primary and secondary compartment, a valve in each primary compartment, operative connection between the primary valves and the steering mechanism of the vehicle, yielding pressure transmitting means interposed in said steering mechanism, conduits connecting the primary compartments with one end of each control cylinder, secondary valves in the secondary compartments, conduits connecting the secondary compartments with the remaining ends of the control cylinders, said secondary valves being engageable by said primary valves, exhaust means associated with said secondary compartments, and means for supplying pressure fluid to said primary compartments.

In witness whereof I have hereunto set my hand.

WALTER GEHRIG.